US012571617B2

(12) United States Patent
Wurzel et al.

(10) Patent No.: US 12,571,617 B2
(45) Date of Patent: Mar. 10, 2026

(54) TESTING AND DATA TRANSFER TO ARTILLERY GUIDING KITS

(71) Applicant: ELBIT SYSTEMS—ROKAR LTD, Jerusalem (IL)

(72) Inventors: Gil Wurzel, Jerusalem (IL); Assaf Malul, Jerusalem (IL)

(73) Assignee: ELBIT SYSTEMS—ROKAR LTD, Jerusalem (IL)

( * ) Notice: Subject to any disclaimer, the term of this patent is extended or adjusted under 35 U.S.C. 154(b) by 699 days.

(21) Appl. No.: 17/889,435

(22) Filed: Aug. 17, 2022

(65) Prior Publication Data

US 2023/0053512 A1 Feb. 23, 2023

(30) Foreign Application Priority Data

Aug. 19, 2021 (IL) ........................................ 285727

(51) Int. Cl.

| | |
|---|---|
| ***F42B 10/04*** | (2006.01) |
| ***F42B 10/26*** | (2006.01) |
| ***F42B 10/64*** | (2006.01) |
| ***F42B 15/01*** | (2006.01) |
| ***H01R 12/72*** | (2011.01) |

(52) U.S. Cl.

CPC .............. *F42B 10/04* (2013.01); *F42B 10/26* (2013.01); *F42B 10/64* (2013.01); *F42B 15/01* (2013.01); *H01R 12/72* (2013.01)

(58) Field of Classification Search

CPC ........... F42B 10/04; F42B 10/26; F42B 15/01

See application file for complete search history.

(56) References Cited

U.S. PATENT DOCUMENTS

| | | | | |
|---|---|---|---|---|
| 3,010,677 A * | 11/1961 | Guthrie | G01S 3/787 | 244/3.21 |
| 3,623,045 A * | 11/1971 | Ouellette | G01S 17/10 | 340/870.18 |
| 7,584,922 B2 * | 9/2009 | Bar | F42B 10/26 | 102/501 |
| 9,303,964 B2 | 4/2016 | Wurzel et al. | | |
| 9,587,923 B2 | 3/2017 | Wurzel et al. | | |

(Continued)

FOREIGN PATENT DOCUMENTS

GB 381911 10/1932

OTHER PUBLICATIONS

Extended European Search Report for EP Patent Application No. 22190858.5, mailed Jan. 3, 2023.

*Primary Examiner* — Benjamin P Lee

(74) *Attorney, Agent, or Firm* — PEARL COHEN ZEDEK LATZER BARATZ LLP

(57) ABSTRACT

Projectile guiding assemblies, caps and methods of delivering power for testing and optionally data over spring-mounted fin(s) of the guiding assembly are provided. The guiding assemblies are configured to have continuous electrically conductive path(s) from the fin(s), through the respective spring(s) on which the fin(s) are mounted, and into the electronics module, which may receive power for testing and guiding data from external source(s) over the electrically conductive path(s). In the testing state, cap mechanically secures the fin(s) to contact(s) thereupon to assure continuous power and data transfer, sparing surface area that was previously dedicated to power and data transfer and simplifying these processes, especially under field conditions.

14 Claims, 7 Drawing Sheets

(56) References Cited

U.S. PATENT DOCUMENTS

| | | | | |
|---|---|---|---|---|
| 9,945,649 | B2 | 4/2018 | Malul et al. | |
| 11,085,750 | B2 * | 8/2021 | Feda | F42C 17/04 |
| 12,313,389 | B1 * | 5/2025 | Krafcik | F42C 15/184 |
| 12,392,588 | B1 * | 8/2025 | Chupp | F42B 10/16 |
| 2008/0302906 | A1 * | 12/2008 | Bar | F42B 10/64 244/3.22 |
| 2012/0001016 | A1 * | 1/2012 | Rastegar | F41G 7/007 244/3.16 |
| 2015/0247715 | A1 * | 9/2015 | Wurzel | F42B 15/01 244/3.23 |
| 2016/0245631 | A1 | 8/2016 | Wurzel et al. | |

* cited by examiner

TESTING AND DATA TRANSFER TO ARTILLERY GUIDING KITS

CROSS REFERENCE TO RELATED APPLICATIONS

This application claims the priority of Israel Patent Application No. 285727, filed on Aug. 19, 2021, which is hereby incorporated by reference in its entirety.

BACKGROUND OF THE INVENTION

1. Technical Field

The present invention relates to the field of artillery, and more particularly, to guiding kits for projectiles.

2. Discussion of Related Art

U.S. Pat. No. 9,945,649, which is incorporated herein by reference in its entirety, discloses, inter alia, an apparatus for guiding a cannon shell accurately, which includes two main parts adapted to be installed on the leading end of the cannon shell. The front main part of the apparatus is equipped with at least one pair of fins and is rotatable with respect to the rear main part. The pair of fins is controlled to hold the front main part substantially stable with respect to an external reference frame when the cannon shell rotates as it flies towards its target. Control system is comprised within the apparatus that receives location signals and is adapted to provide guiding control commands to the cannon shell via the fins so as to guide the shell accurately to its preprogrammed target. The control system is adapted to activate the detonation chain of the shell according to preprogrammed mode U.S. Pat. Nos. 9,587,923 and 9,303,964, which are incorporated herein by reference in its entirety, disclose, inter alia, guiding assemblies that are adapted to be connected to a projectile and comprising a rear main unit adapted to be connected to the front end of the projectile, and a front main unit rotatably connected at its rear end to the front end of the rear main unit. The front main unit is adapted to rotate about a central longitudinal axis. A relative speed control unit is operable between the rear main unit and the front main unit and capable of providing spin braking force to slow the relative speed of rotation of the front main unit. An at least one guiding fin radially extends from the front main unit. The pitch angle of the fin is controllable by a return spring connected to the fin so that the pitch angle of the fin is growing as the aerodynamic pressure on the fin lowers and it is growing smaller as the aerodynamic pressure on the fin gets bigger.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a projectile guiding assembly comprising at least one spring-mounted fin and an electronics module, wherein: the guiding assembly is configured to have a continuous electrically conductive path from the at least one fin, through at least one spring on which the at least one fin is mounted and into the electronics module, the guiding assembly is configured to have a testing state, in which the at least one fin and the at least one spring are configured to secure the electrically conductive path, and the electronics module is electrically insulated except for said path, and is further configured to receive power and optionally data through the at least one fin and the at least one spring in the testing state of the guiding assembly.

One aspect of the present invention provides a cap for delivering power and optionally data to the projectile guiding assemblies, the cap comprising at least one electrical contact and is configured to detachably affix the guiding assembly in the testing state, with the at least one fin pressed against the at least one electrical contact.

One aspect of the present invention provides a method of delivering power and optionally data to a projectile guiding assembly, the method comprising securing electric connectivity of at least one spring-mounted fin of the guiding assembly through a spring on which the fin is mounted to an electronics module of the guiding assembly and delivering power and optionally data to the electronics module by detachably affixing the at least one fin to an external unit.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
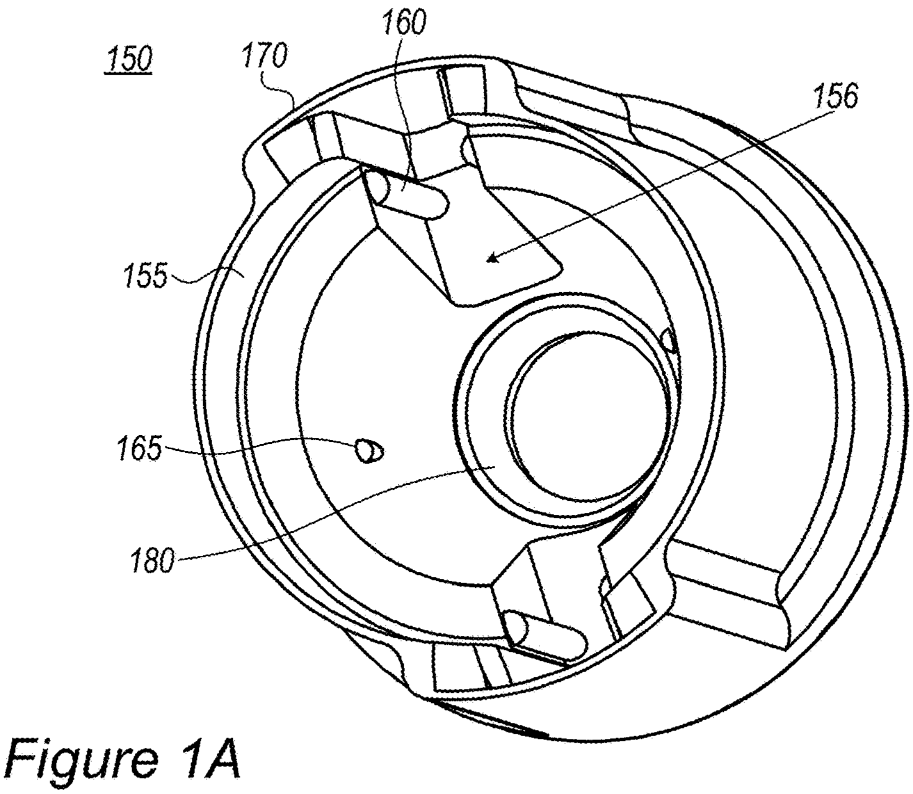
FIGS. 1A, 1B, 2A, 2B, 3A-3D and 4A, 4B are schematic illustrations of caps for projectile guiding assemblies, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for transferring power and data to projectile guiding assemblies and thereby provide improvements to the technological field of accurate artillery. Projectile guiding assemblies, caps and methods of delivering power for testing and optionally data over spring-mounted fin(s) of the guiding assembly are provided. The guiding assemblies are configured to have continuous electrically conductive path(s) from the fin(s), through the respective spring(s) on which the fin(s) are mounted, and into the electronics module, which may receive power for testing and guiding data from external source(s) over the electrically conductive path(s). In the testing state, cap mechanically secures the fin(s) to contact(s) thereupon to assure continuous power and data transfer, sparing surface area that was previously dedicated to power and data transfer and simplifying these processes, especially under field conditions.

Figure 1B:
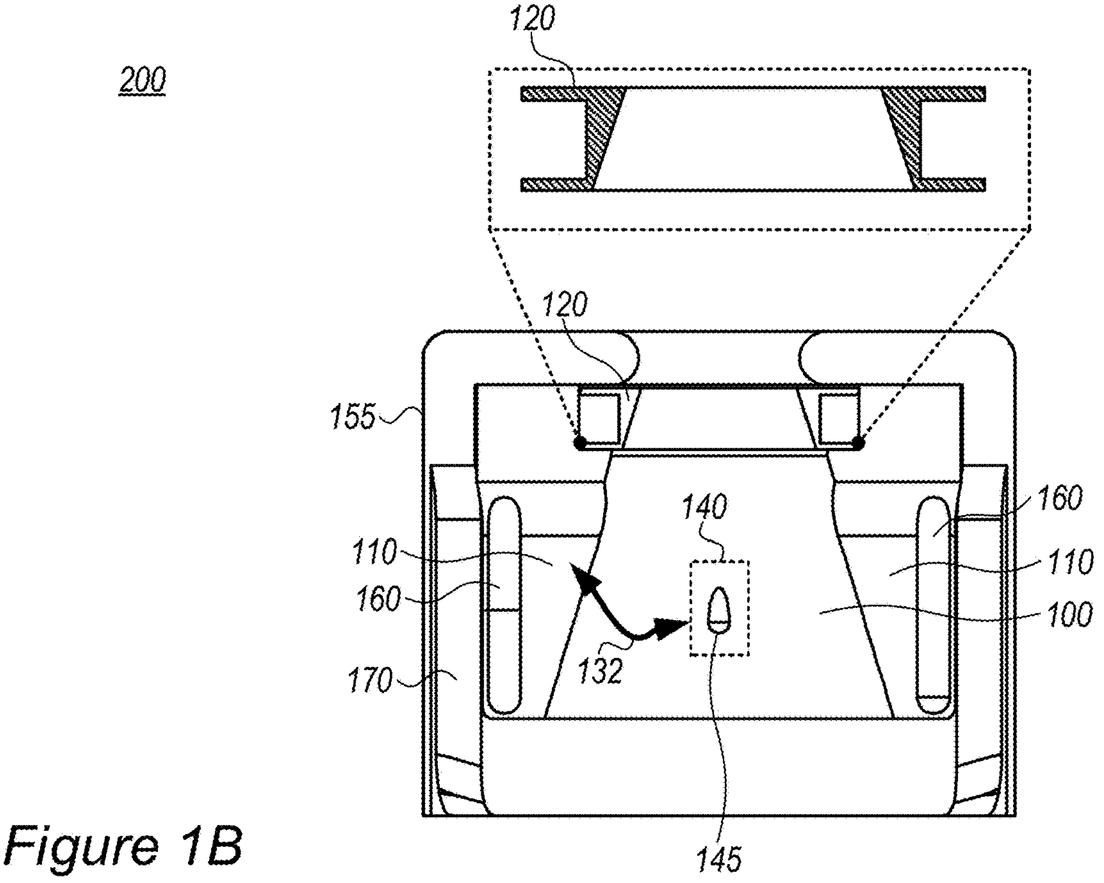
Figure 2A:
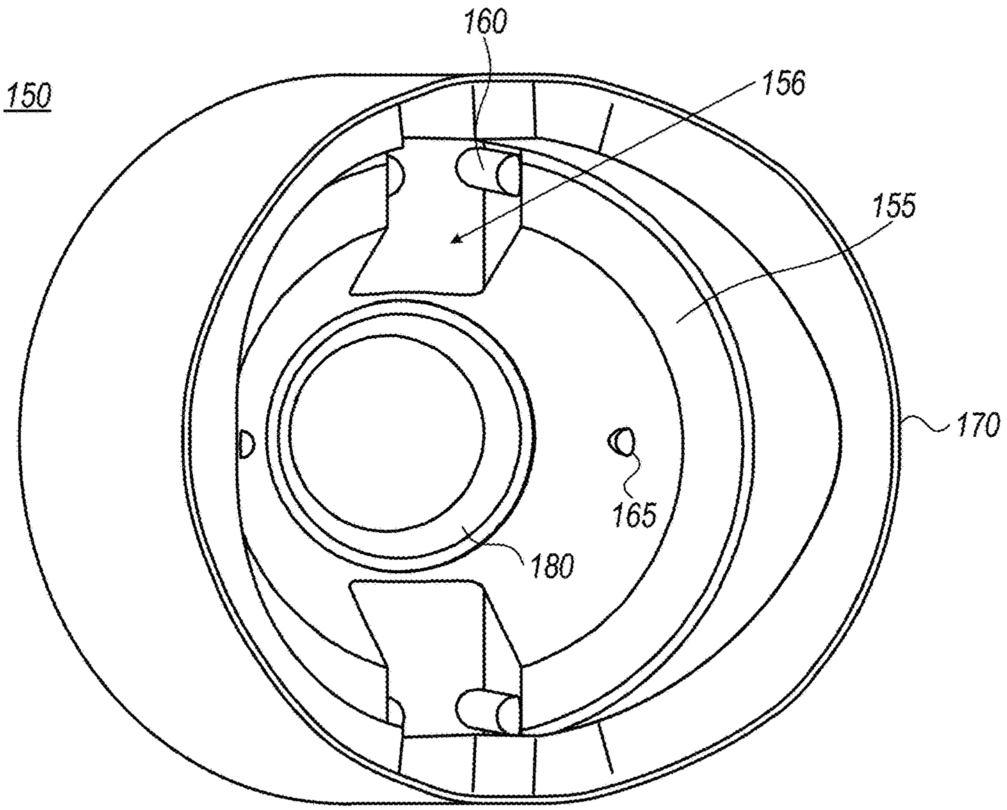
Figure 4A:
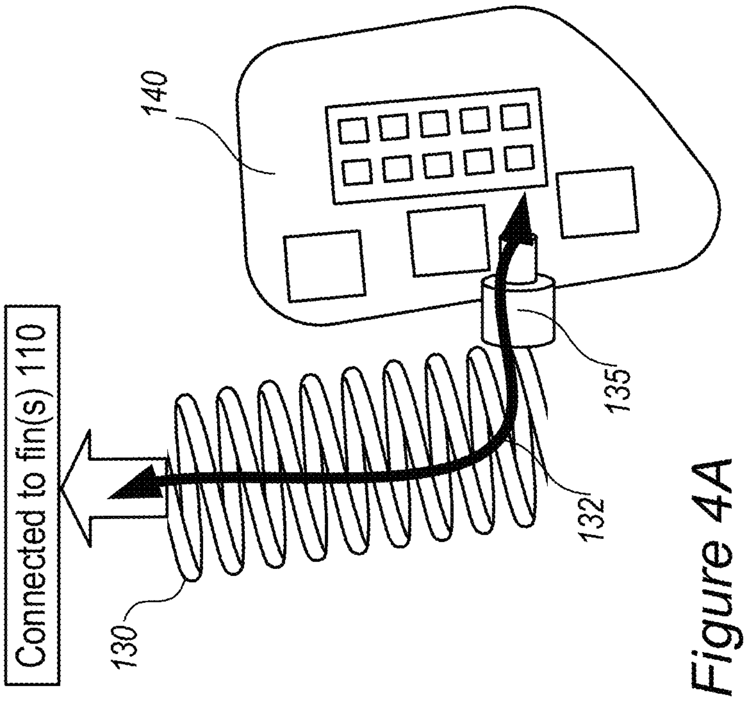
Figure 4B:
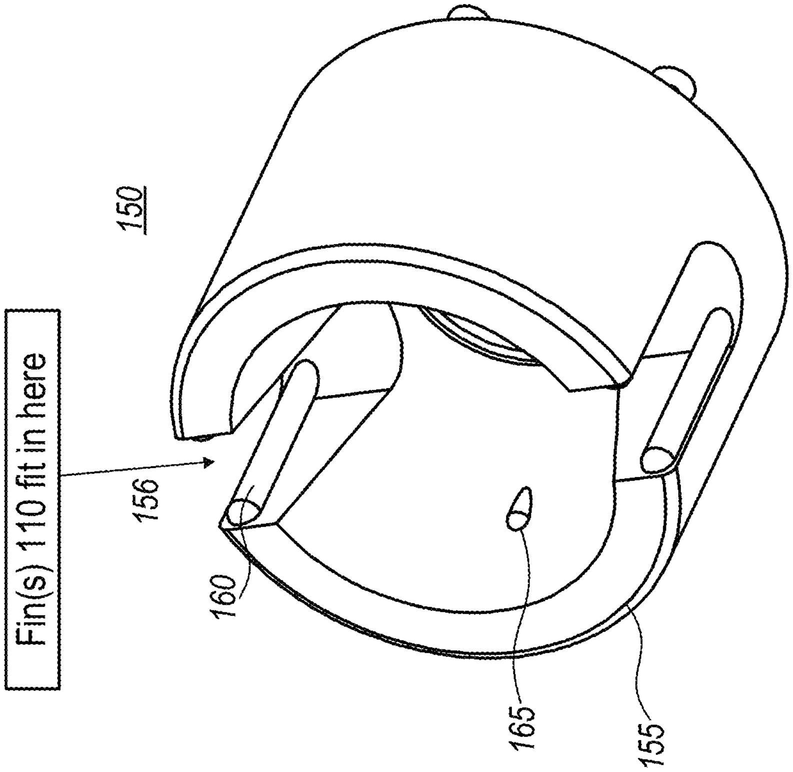
Figure 5A:
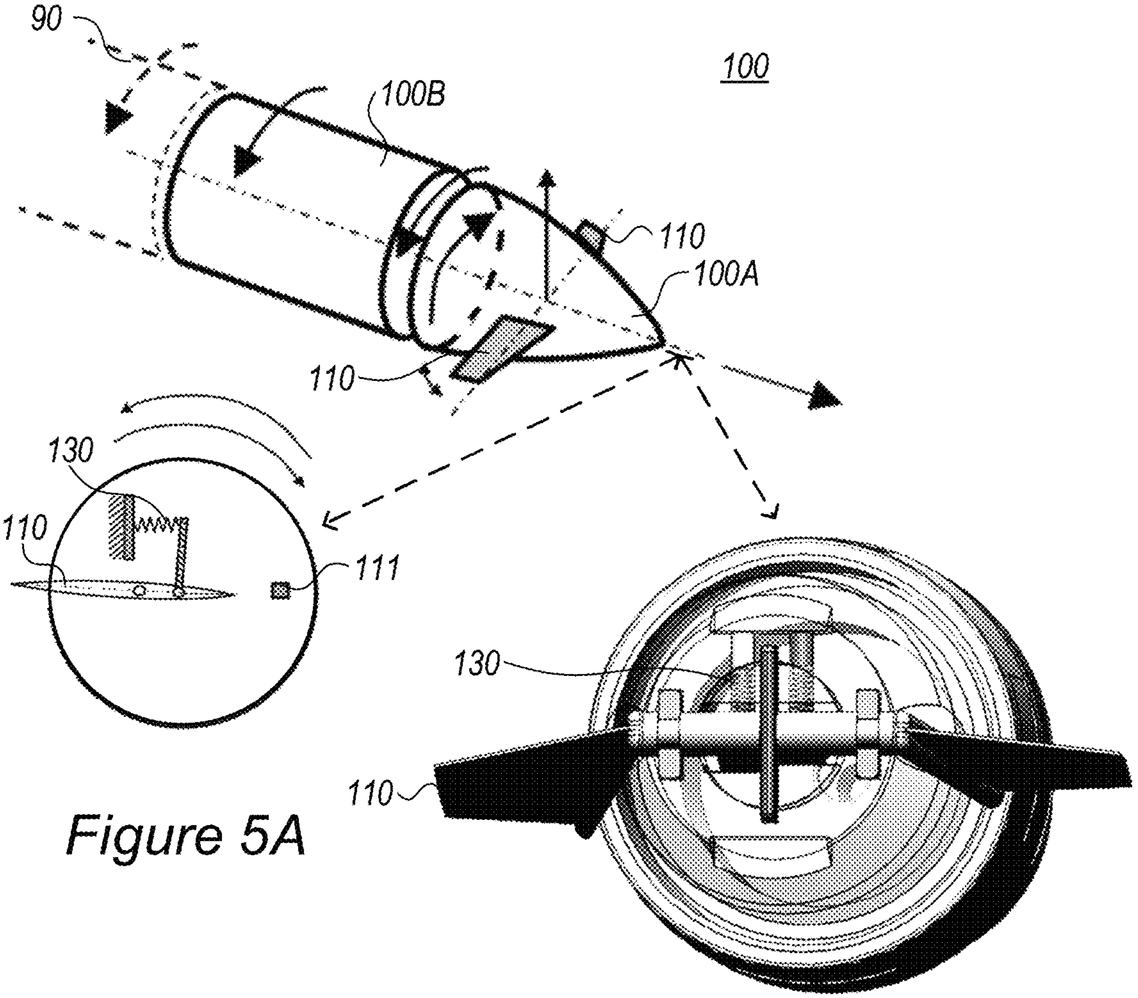
FIGS. 5A-5C illustrate schematically embodiments of projectile guiding assemblies, according to some embodiments of the invention.
Figure 5B:
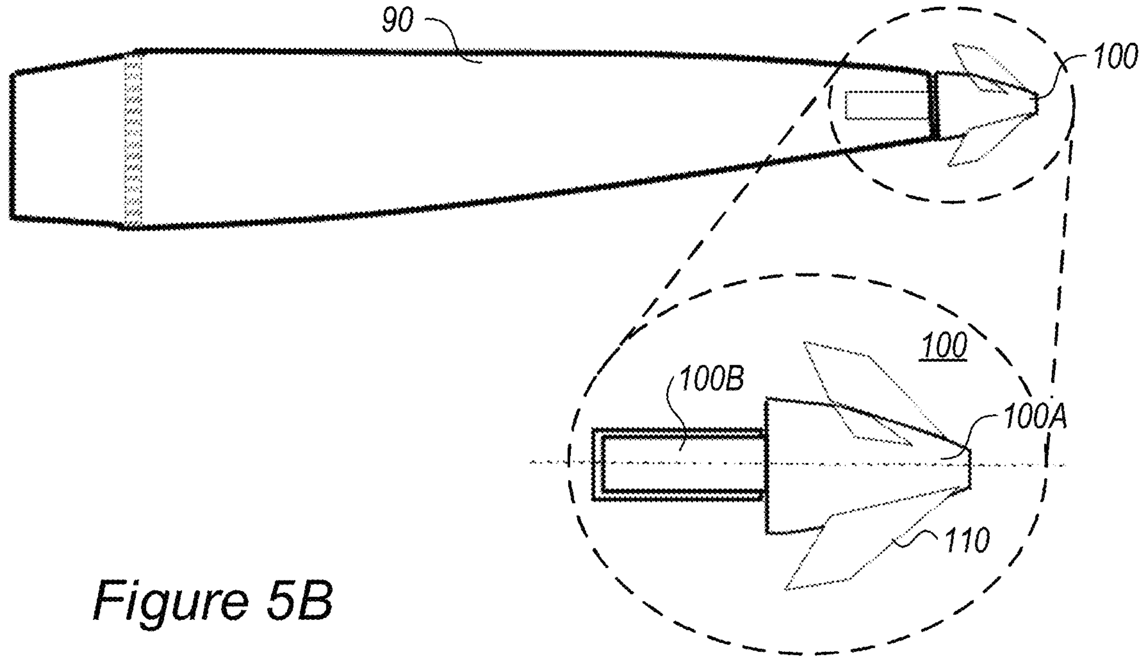
Figure 5C:
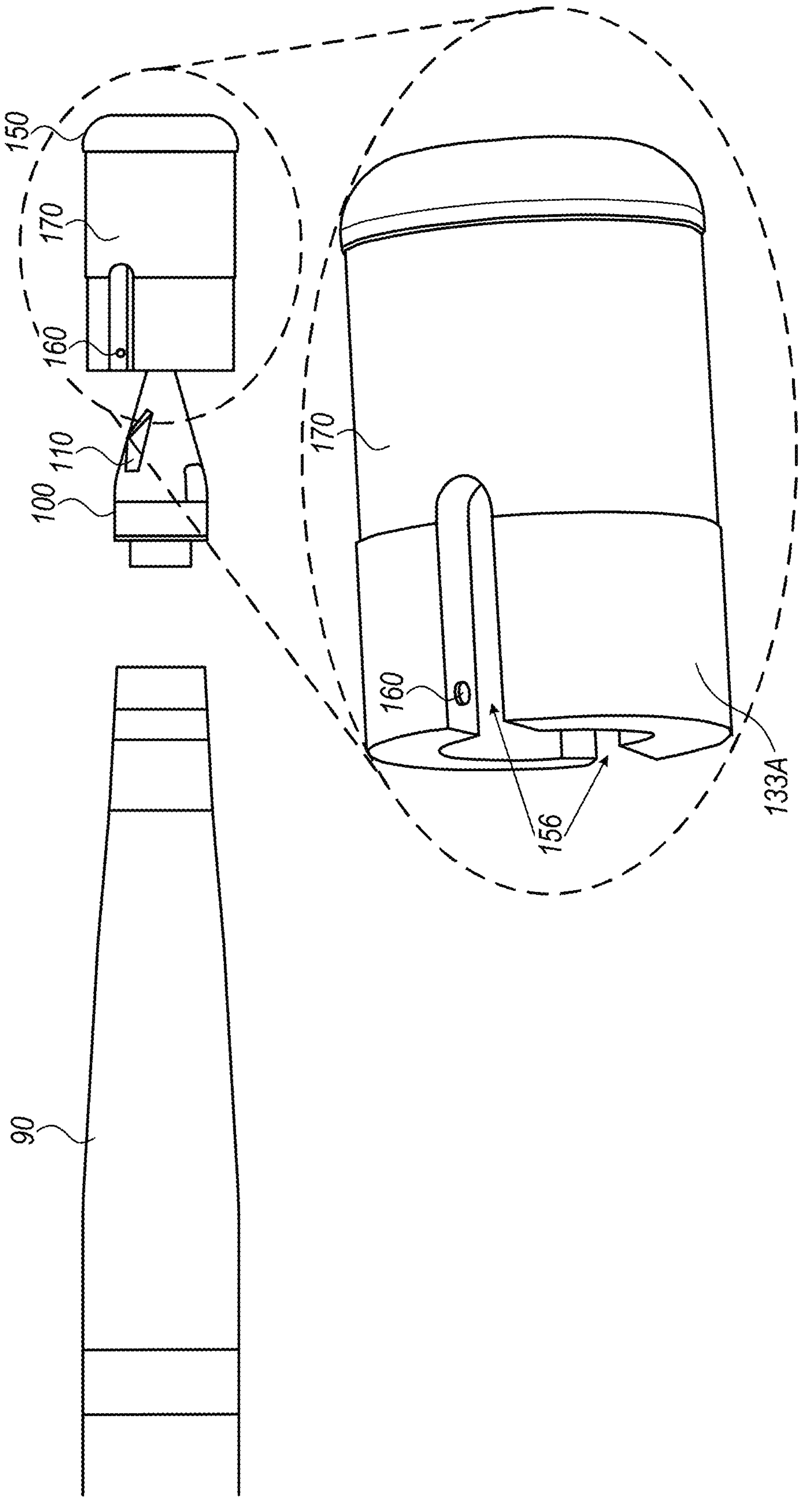

FIGS. 1A, 1B, 2A, 2B, 3A-3D and 4A, 4B are schematic illustrations of caps 150 for projectile guiding assemblies 100, according to some embodiments of the invention. FIGS. 1A, 2A and 4B are perspective views of caps 150 and FIGS. 1B, 2B and 3A-3D are side views of projectile guiding assemblies 100 engaged (200) within caps 150 for delivering power in a testing state of guiding assembly 100. FIG. 4A illustrates schematically a part of a continuous electrically conductive path 132 between an electronics module 140 and fin(s) 110 of projectile guiding assembly 100. FIGS. 5A-5C illustrate schematically embodiments of projectile guiding assemblies 100, according to some embodiments of the invention. Projectile guiding assembly 100 may be attached to any type of projectile, such as cannon shells, rockets, mortar shells, etc.

Figure 2B:
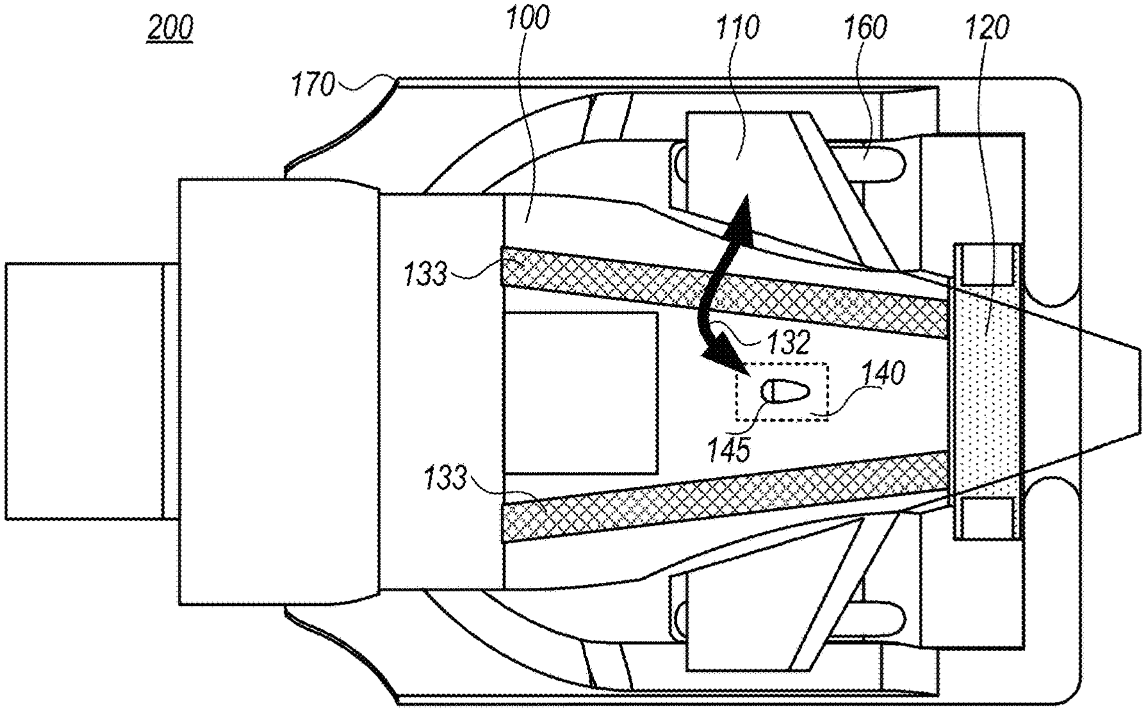
Figure 3D:
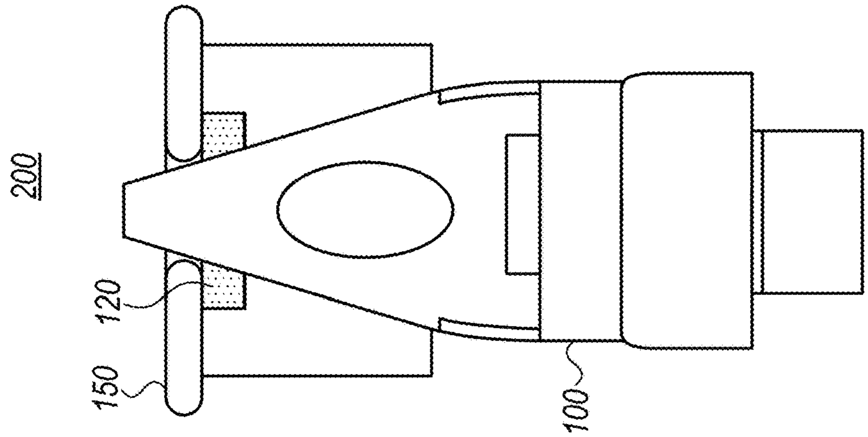
Figure 3C:
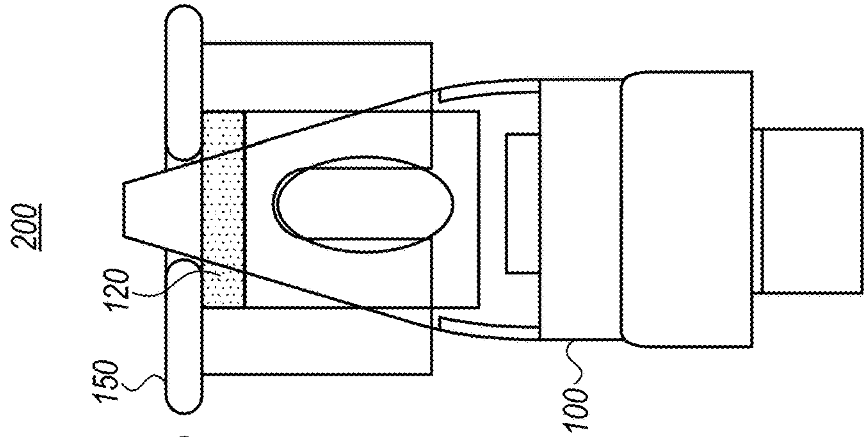
Figure 3B:
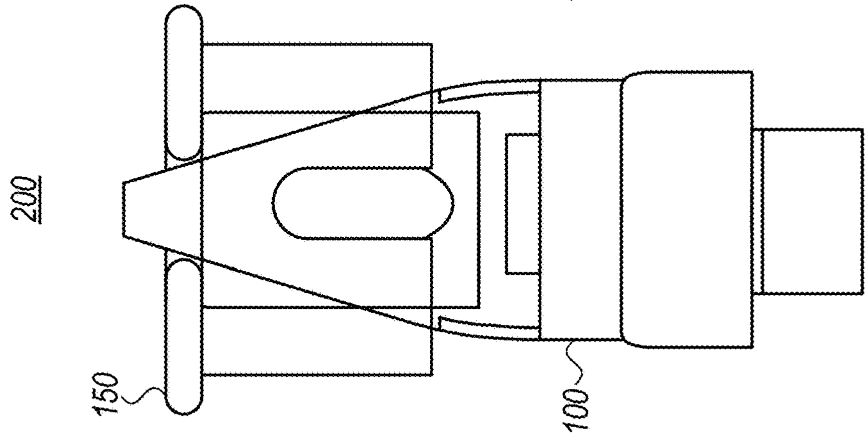
Figure 3A:
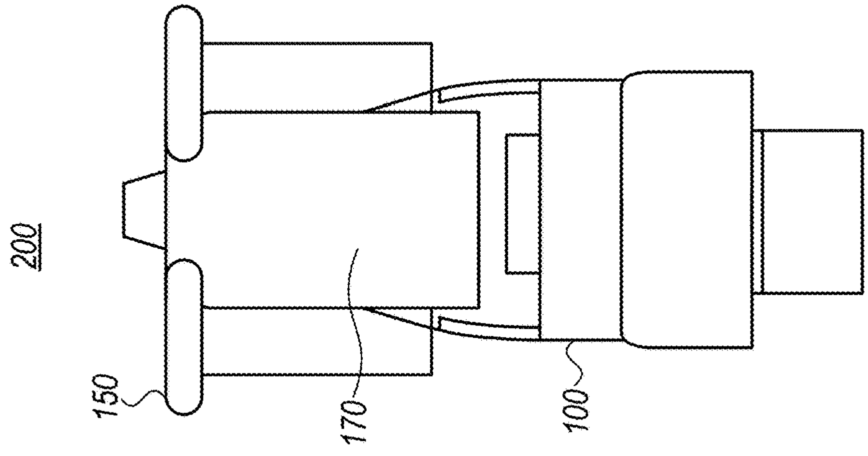

Disclosed projectile guiding assemblies 100, which may be fuse-sized and adapted to be connected to a projectile 90 (see FIGS. 5A-5C), may comprise at least one spring-mounted fin 110 (mounted on spring 130, see FIG. 4A) and an electronics module 140 (see FIGS. 1B, 2B and 4A, illustrated schematically as being beneath the surface of guiding assembly 100). Guiding assembly 100 may be configured to have a continuous electrically conductive path (illustrated schematically by arrow 132 in FIGS. 2B and 4A) from fin(s) 110, through at least one spring 130 on which fin(s) 110 is mounted and into electronics module 140. Guiding assembly 100 may further be configured to have a testing state (when engaged 200 with cap 150), in which fin(s) 110 and spring(s) 130 are configured to secure electrically conductive path 132. In certain embodiments, one or more fin(s) 110 may not be spring-mounted, and electrically conductive path 132 may be secured from fin(s) 110 to electronics module 140, e.g., via contacts and/or wires. Electronics module 140 is further configured to be electrically insulated (illustrated schematically by bands 133) except for said path 132. For example, insulation may be carried out by applying an anodic coating (e.g., hard anodizing according to MIL-A-8625). The conductive areas may be coated by alodyne. Electronics module 140 is further configured to receive power, and optionally data modulated upon respective power parameters (e.g., DC power and modulated AC data) through fin(s) 110 and (optionally) spring(s) 130, over continuous electrically conductive path 132—in the testing state of guiding assembly 100.

In certain embodiments, only power delivery for testing may be carried out via fin(s) 110, while data may be transferred to guiding assembly 100 wirelessly (e.g., using radiofrequency, RF signals). Testing (e.g., self-testing) may be carried out by built-in procedures in electronics unit 140, powered by the power delivered in testing stage 200 via cap 150.

Cap 150 comprises at least one electrical contact 160 and is configured to detachably affix guiding assembly 100 in the testing state, with at least one fin 110 pressed against electrical contact(s) 160. Cap 150 may be connected to an external power source for testing guiding assembly 100 and optionally to deliver data (see examples below) to electronics module 140 of guiding assembly 100, e.g., modulated upon provided power for testing (e.g., delivered DC power with AC data modulation) or independently therefrom. Advantageously, direct power and/or data delivery via fin(s) 110 spares the need to dedicate area on the surface of guiding assembly 100 for dedicated contacts and is also more robust than using an external power or data delivering device connected to the dedicated contacts—with respect to reliability of the equipment, especially under rough environmental conditions. Direct power and/or data delivery via fin(s) 110 not only spares area on the surface of guiding assembly 100 but is also simpler, more efficient and more economical than the prior art use of dedicated contacts.

Cap 150 may further comprise one or more slot(s) 156 configured to receive fin(s) 110 and secure mechanically the electric connection between fin(s) 110 and electrical contact(s) 160. A conductive structure 170 may be configured to support contact(s) 160 and slot(s) 156 mechanically and electrically during the engagement with fin(s) 110 and secure the electrical connectivity therebetween. For example, securing fin(s) 110 in slot(s) 156 may be carried out by pressing fin(s) 110 by contact(s) 160 against spring(s) 130 to ensure stable electrical connectivity during the power and data transfer (see, e.g., FIGS. 1A, 2B and 4B).

Cap 150 may further comprise a ground contact 165, that overlaps and connects to a ground contact 145 on guiding assembly 100. In testing state 200, ground contact 165 of cap 150 is configured to be pressed against corresponding ground contact 145 on projectile guiding assembly 100.

Cap 150 may comprise a body 155 supporting conductive structure 170. Cap 150 may comprise a ring 180 that engages a corresponding ring 120 on guiding assembly 100 to optionally install an additional fuse and deliver power by induction. It is noted however that induction mechanisms are insufficient to provide the power required for testing as disclosed herein.

FIGS. 5A-5C schematically illustrates various embodiments of projectile guiding assembly 100 attached to cannon shells and rockets as respective projectiles 90. In various embodiments, projectile guiding assembly 100 may comprise a rear main unit 100B (having a central longitudinal axis) adapted to be connected at its rear side to a front end of projectile 90, a front main unit 100A rotatably connected at its rear end to a front end of rear main unit 100B and adapted to rotate about the central longitudinal axis (see schematic illustration in FIG. 5A), and a relative speed control unit (not illustrated) operable between rear main unit 100B and front main unit 100A and capable of providing spin braking force to slow the relative speed of rotation of front main unit 100A controllably—by changing the pitch angle of spring-mounted fin(s) 110. For example, FIG. 5A illustrates schematically configurations with two fins 110 and with one fin 110 (with spring mounting and a counter-weight 111, both illustrated schematically). Such embodiments are incorporated herein by reference in their entirety from U.S. Pat. Nos. 9,587,923 and 9,303,964. FIG. 5B illustrates schematically configurations with projectile guiding assembly 100 comprising front main part 100A with at least one pair of fins 110, which is rotatable with respect to rear main part 100B, incorporated herein by reference in their entirety from U.S. Pat. No. 9,945,649. It is noted that pair of fins 110 illustrated schematically in FIGS. 5A and/or 5B may be considered a single fin or wing, and an additional fin or wing may be present at a different plane. Power and/or data transfer may be carried out via one or more fin and/or via one or more fin parts. In some embodiments, illustrates e.g., in FIG. 5C, projectile 90 may comprise a rocket, and cap 150 may be configured as a disposable cap used to deliver power and optionally data, and protect projectile guiding assembly 100 when attached to rocket 90. FIG. 5C further illustrates schematically conductive region(s) 170 and insulating regions 133A on cap 150. Conductive region(s) 170 may be used to deliver power and optionally data through contact(s) 160 in slot(s) 156 to fin(s) 110, while insulating regions 133A may be configured to secure power (and data) transfer only through electrically conductive path 132.

Elements from FIGS. 1A-5C may be combined in any operable combination, and the illustration of certain elements in certain figures and not in others merely serves an explanatory purpose and is non-limiting.

Figure 6:
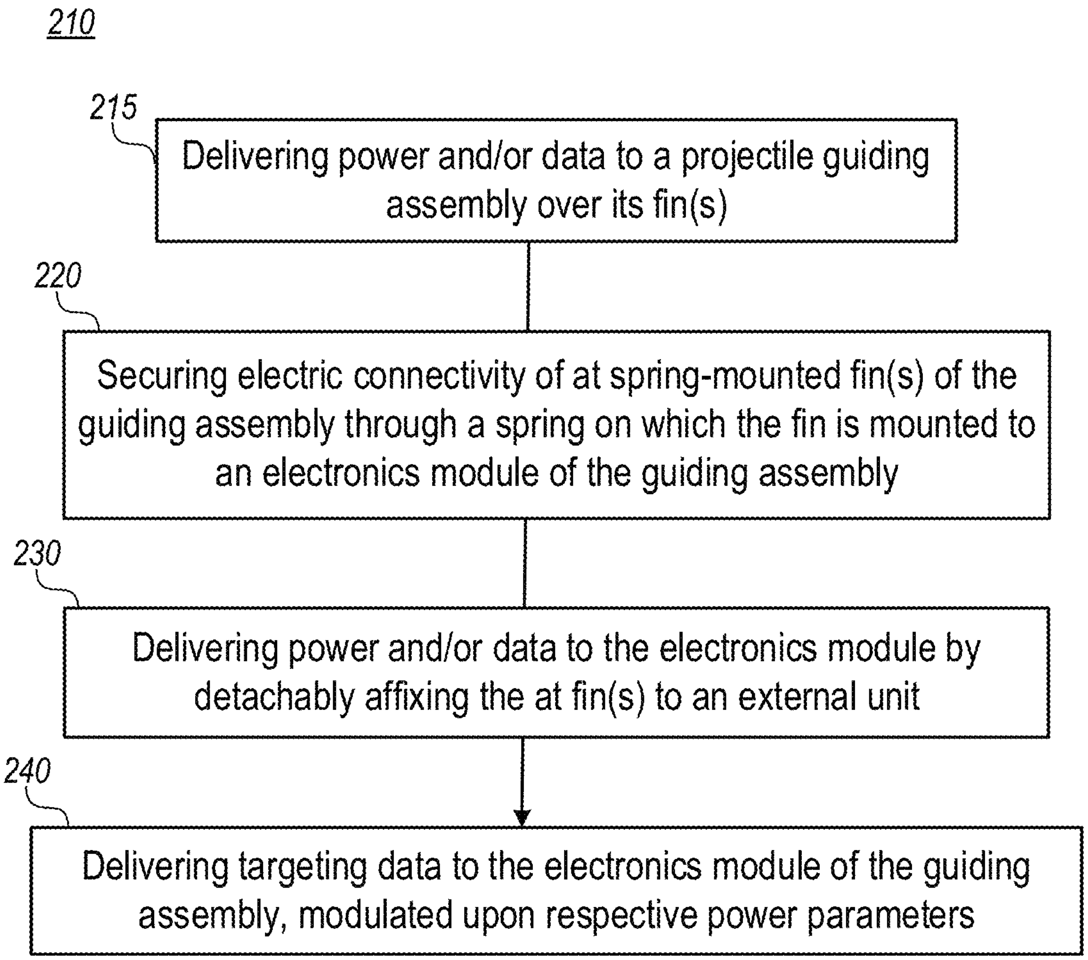
FIG. 6 is a high-level flowchart illustrating a method, according to some embodiments of the invention.

FIG. 6 is a high-level flowchart illustrating a method 210, according to some embodiments of the invention. The method stages may be carried out with respect to projectile guiding assembly 100 described above, which may optionally be configured to implement method 210. Method 210 may comprise the following stages, irrespective of their order.

Method 200 may comprise delivering power and/or data to a projectile guiding assembly over its fin(s) (stage 215), comprising: securing electric connectivity of at least one spring-mounted fin of the guiding assembly through a spring on which the fin is mounted to an electronics module of the guiding assembly (stage 220), delivering power and/or data to the electronic module by detachably affixing the at least one fin to an external unit (stage 230), and delivering targeting data to the electronics module of the guiding assembly, modulated upon respective power parameters (stage 240). For example, the power may be used to enable testing (e.g., self-testing) of the projectile guiding assembly and optionally to deliver guiding data, which may be modulated upon the delivered power.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A projectile guiding assembly comprising at least one spring-mounted fin and an electronics module, wherein:

the at least one spring-mounted fin is configured to have a controllably changeable pitch angle, the guiding assembly is detachably affixed to a cap and the at least one fin is pressed against at least one electrical contact of the cap, the guiding assembly is configured to have a continuous electrically conductive path from the at least one fin, pressed against the at least one electrical contact of the cap by the at least one spring on which the at least one fin is mounted, and into the electronics module, the guiding assembly is configured to have a testing state, in which the at least one fin and the at least one spring are configured to secure the electrically conductive path, and the electronics module is electrically insulated except for said path, and is further configured to receive power over the continuous electrically conductive path in the testing state of the guiding assembly.

2. The projectile guiding assembly of claim 1, attached to at least one of a cannon shell, a mortar shell and a rocket.

3. The projectile guiding assembly of claim 1, wherein the electronics module is configured to receive data that is modulated upon a power signal received by the electronics module.

4. The projectile guiding assembly of claim 1, wherein the electronics module is configured to receive data wirelessly.

5. The projectile guiding assembly of claim 1, adapted to be connected to an artillery shell, and further comprising:

a rear main unit adapted to be connected at its rear side to a front end of said projectile, said rear main unit having a central longitudinal axis, a front main unit rotatably connected at its rear end to a front end of said rear main unit and adapted to rotate about said central longitudinal axis, and a relative speed control unit operable between said rear main unit and said front main unit and capable of providing spin braking force to slow the relative speed of rotation of said front main unit, wherein said braking force is controllable by changing a pitch angle of the at least one spring-mounted fin, wherein the electronics module is further configured to receive data over the continuous electrically conductive path in the testing state of the guiding assembly.

6. A cap for delivering power to the projectile guiding assembly of claim 1, the cap comprising at least one electrical contact and is configured to detachably affix the guiding assembly in the testing state, with the at least one fin pressed against the at least one electrical contact.

7. The cap of claim 6, further comprising at least one slot configured to press the at least one fin against the at least one electrical contact to secure the electrical connectivity therebetween.

8. The cap of claim 6, further comprising a ground contact configured to be pressed against a corresponding ground contact on the projectile guiding assembly in the testing state thereof.

9. A method of delivering power to a projectile guiding assembly, wherein the projectile comprises at least one spring-mounted fin that is configured to have a controllably changeable pitch angle and wherein the guiding assembly is detachably affixed to a cap, the method comprising:

securing electric connectivity of the at least one spring-mounted fin when pressed against at least one electrical contact of the cap by at least one spring on which the at least one fin is mounted, to an electronics module of the guiding assembly, wherein the guiding assembly has a testing state, in which the at least one fin and the at least one spring secure the electrically conductive path, and wherein the electronics module is electrically insulated except for said path, and is further configured to receive power over the electrically conductive path in the testing state of the guiding assembly, and delivering power to the electronics module by detachably affixing the at least one fin to the cap.

10. The method of claim 9, further comprising modulating data delivered to the electronics module upon respective power parameters.

11. The projectile guiding assembly of claim 1, wherein the electronics module is further configured to receive data over the continuous electrically conductive path in the testing state of the guiding assembly.

12. The cap of claim 6, further configured to deliver data to the projectile guiding assembly.

13. The method of claim 9, further configured to deliver data to the electronics module by detachably affixing the at least one fin to an external unit.

14. A method of delivering power and data to a projectile guiding assembly, the method comprising:

securing electric connectivity of at least one spring-mounted fin of the guiding assembly through at least one spring on which the at least one fin is mounted to an electronics module of the guiding assembly, wherein the guiding assembly has a testing state, in which the at least one fin and the at least one spring secure the electrically conductive path, and delivering power and data to the electronics module by detachably affixing the at least one fin to an external unit, the method further comprising modulating data delivered to the electronics module upon respective power parameters.

* * * * *